US009742649B2

(12) United States Patent
Carr et al.

(10) Patent No.: US 9,742,649 B2
(45) Date of Patent: Aug. 22, 2017

(54) TELEMETRY MONITORING APPARATUS

(71) Applicant: Draeger Safety UK Limited, Blyth (Northumberland) (GB)

(72) Inventors: Conor Carr, North Tyneside (GB); Matthew Barnes, Newcastle Upon Tyne (GB); Marcus Berney-Smith, Morpeth (GB)

(73) Assignee: Draeger Safety UK Limited (GB)

( * ) Notice: Subject to any disclaimer, the term of this patent is extended or adjusted under 35 U.S.C. 154(b) by 582 days.

(21) Appl. No.: 13/974,529

(22) Filed: Aug. 23, 2013

(65) Prior Publication Data
US 2014/0068063 A1    Mar. 6, 2014

(30) Foreign Application Priority Data

Aug. 30, 2012   (GB) .................................. 1215468.8

(51) Int. Cl.
| | | |
|---|---|---|
| *G06F 15/173* | (2006.01) | |
| *H04L 12/26* | (2006.01) | |
| *G08B 25/01* | (2006.01) | |
| *G08B 21/02* | (2006.01) | |
| *G08B 25/00* | (2006.01) | |

(52) U.S. Cl.
CPC .......... *H04L 43/10* (2013.01); *G08B 21/0238* (2013.01); *G08B 25/001* (2013.01); *G08B 25/002* (2013.01); *G08B 25/016* (2013.01)

(58) Field of Classification Search
CPC ............... A62C 99/00; G01N 33/0075; G07C 9/00103; G07C 9/00111; G07C 1/10; G08B 21/0233; G08B 21/04; G08B 25/001; G08B 25/002; G08B 25/016; H04M 11/00
See application file for complete search history.

(56) References Cited

U.S. PATENT DOCUMENTS

| | | | |
|---|---|---|---|
| 2002/0095487 A1* | 7/2002 | Day et al. ...................... 709/223 |
| 2005/0027995 A1* | 2/2005 | Menschik ............. G06F 19/321 |
| | | | 713/193 |
| 2005/0289222 A1* | 12/2005 | Sahim .......................... 709/206 |
| 2007/0120671 A1 | 5/2007 | Carmichael et al. |
| 2007/0192845 A1* | 8/2007 | Lankheim ....................... 726/12 |
| 2008/0189162 A1* | 8/2008 | Ganong et al. .................... 705/9 |
| 2010/0081411 A1 | 4/2010 | Montenero |
| 2014/0028818 A1* | 1/2014 | Brockway et al. ............. 348/61 |

FOREIGN PATENT DOCUMENTS

FR    2775102 A1    8/1999

OTHER PUBLICATIONS

Search Report issued Jan. 21, 2013 in co-pending GB Application No. 1215468.8.

* cited by examiner

*Primary Examiner* — Brian Whipple
*Assistant Examiner* — Gregory P Tolchinsky
(74) *Attorney, Agent, or Firm* — DLA Piper LLP (US)

(57) ABSTRACT

There is disclosed a telemetry monitoring apparatus for remotely monitoring a plurality of users, such as firefighters, working in a hazardous environment. The apparatus comprises a plurality of portable devices, each arranged to be associated with breathing apparatus worn by a user, and at least one central monitoring station onto which portable devices can be logged on and monitored. The portable devices are arranged to transmit a logon message including an identifier identifying either the user or the portable device.

15 Claims, 3 Drawing Sheets

TELEMETRY MONITORING APPARATUS

BACKGROUND

The invention relates to a telemetry monitoring apparatus, a central monitoring station and a method of logging a portable device onto a central monitoring station.

Firefighters and other rescue personnel are often required to enter hazardous environments, such as burning buildings. In such circumstances, the firefighter is provided with self-contained breathing apparatus (SCBA) which provides breathable gas to the firefighter.

Breathing apparatus may be provided with a portable device including an electronic monitoring unit which provides information to the firefighter. This information may include the amount of breathable gas remaining, cylinder pressure, time-to-whistle (TTW), and temperature, for example. This information can be monitored by the firefighter to allow them to work safely and within the restrictions of the breathing apparatus. The monitoring unit may also perform the functions of an automatic distress signal unit (ADSU), otherwise referred to as a personal alert safety system (PASS). Such devices are provided with a motion sensor, a panic button, and an alarm. If the device does not detect motion within a pre-determined period of time then an audible pre-alarm is activated. If this pre-alarm is not cancelled by either movement or by pressing a button within a pre-determined period of time then an audible full-alarm is activated. This indicates to others in the vicinity that the wearer is in distress. The panic button can also be manually activated to sound the alarm if required. British Home Office Standard JCDD/38 specifies the requirements of an ADSU.

To ensure the safety of a firefighter within a hazardous environment, it is also desirable to monitor their status from outside of the incident. This is typically the responsibility of a designated entry control officer.

Typically, the entry control officer uses an entry control board (ECB) to record information regarding the firefighters. Electronic ECBs exist which are able to remotely monitor the breathing apparatus of the firefighter from outside of the incident. The portable device is provided with a radio unit, which is connected to the electronic monitoring unit, which wirelessly transmits telemetry data to the ECB. The telemetry data includes data such as the amount of breathable gas remaining, cylinder pressure, time-to-whistle (TTW), and temperature. Accordingly, the information displayed on the entry control board is "live" data. The telemetry data may also include any pre-alarms or full-alarms initiated by the ADSU/PASS. Also, the entry control officer may relay information to the firefighter using the entry control board. For example, the entry control officer may transmit an evacuation signal to the firefighter which informs the firefighter to exit the incident.

In order for the electronic ECB to monitor the particular firefighter, the portable device must be registered, or logged onto, the ECB. In a previously considered arrangement this can be done by inserting a plastic tally key associated with the portable device into the ECB. In response to this the ECB initiates logon by sending a logon request message to the specific portable device, and after the exchange of various messages the portable device is logged onto the ECB. In another previously considered arrangement the portable device initiates logon by sending a logon message to the ECB, and after the exchange of various messages the portable device is logged onto the ECB.

Whilst these arrangements are satisfactory, if there are a large number of firefighters and associated portable devices at an incident, it can be inconvenient to initiate the logon of individual portable devices at the ECB. Further, if multiple ECBs are being used at an incident, then initiating logon from the portable device may cause the portable device to be logged onto the incorrect ECB, for example, an ECB associated with a different fire brigade.

It is therefore desirable to provide a telemetry monitoring apparatus with improved logon capabilities, a central monitoring station, such as an ECB, for the same, and a method of logging a portable device onto a central monitoring station.

SUMMARY

According to an aspect of the invention there is provided a method of logging a portable device, associated with breathing apparatus worn by a user, onto a central monitoring station arranged to monitor logged-on portable devices, the method comprising: the portable device sequentially transmitting discrete logon messages including an identifier identifying either the user or the portable device until it receives a logon acknowledgement message from a central monitoring station, the central monitoring station receiving the transmitted logon message, determining whether the identifier included in the received logon message is contained within priority data containing the identifiers of users or portable devices which should be logged onto the central monitoring station, immediately commencing a logon procedure to logon the portable device onto the central monitoring station if it is determined that the identifier is contained within the priority data, commencing a logon procedure after a threshold number of logon messages including the identifier have been received from the portable device if it is determined that the identifier is not contained within the priority data, and transmitting a logon acknowledgement message to the portable device upon commencement of the logon procedure, the portable device transmitting a logon acceptance message to the central monitoring station upon receipt of a logon acknowledgement message.

Another exemplary embodiment of the present invention comprises A method of logging a portable device, associated with breathing apparatus worn by a user, onto a central monitoring station arranged to monitor logged-on portable devices, the method comprising (I) the portable device transmitting a logon message including an identifier identifying either the user or the portable device, (II) the central monitoring station receiving the transmitted logon message, determining whether the identifier included in the received logon message is contained within priority data containing the identifiers of users or portable devices which should be logged onto the central monitoring station, and commencing a logon procedure to logon the portable device onto the central monitoring station if it is determined that the identifier is contained within the priority data.

Another exemplary embodiment of the present invention comprises a telemetry monitoring apparatus for remotely monitoring a plurality of users working in a hazardous environment comprising a plurality of portable devices, each arranged to be associated with breathing apparatus worn by a user and arranged to transmit a logon message including an identifier identifying either the user or the portable device, at least one central monitoring station onto which portable devices can be logged on and monitored, the or each central monitoring station comprising a receiver arranged to receive logon messages, priority data containing the identifiers of users or portable devices which should be logged onto the central monitoring station, a logon determination unit arranged to determine whether the identifier included in a received logon message from a portable device is contained within the priority data, and a logon unit arranged to perform a logon procedure to logon the said portable device onto the central monitoring station, wherein if the logon determination unit determines that the said identifier is contained within the priority data, the logon procedure is commenced.

BRIEF DESCRIPTION OF THE DRAWINGS

Embodiments of the invention will now be described, by way of example, with reference to the accompanying drawings, in which.

DETAILED DESCRIPTION

According to an aspect of the invention there is provided a telemetry monitoring apparatus comprising: a plurality of portable devices, each arranged to be associated with breathing apparatus worn by a user, such as a firefighter, and arranged to transmit a logon message including an identifier identifying either the user or the portable device; at least one central monitoring station onto which portable devices can be logged on and monitored, the or each central monitoring station comprising: a receiver arranged to receive logon messages; priority data containing the identifiers of users or portable devices which should be logged onto the central monitoring station; a logon determination unit arranged to determine whether the identifier included in a received logon message from a portable device is contained within the priority data; and a logon unit arranged to perform a logon procedure to logon the said portable device onto the central monitoring station; wherein if the logon determination unit determines that the said identifier is contained within the priority data, the logon procedure is commenced. The apparatus may ensure that a particular portable device is logged onto a preferred central monitoring station if there is more than one central monitoring station at an incident. The telemetry apparatus may be for remotely monitoring a plurality of users, such as firefighters, working in a hazardous environment.

The identifier may be an identifier that identifies either the user, which may be a firefighter, or the portable device, for example. Therefore, the identifier may be a user, or firefighter identifier, or a portable device identifier. In some embodiments the portable device identifier may be the address of the portable device. The priority data in the central monitoring station may contain a combination of user identifiers, which indicate which users should be logged onto the central monitoring station, and portable device identifiers, which indicate which portable devices should be logged onto the central monitoring station. Of course, other identifiers could be used that indicate which users or portable devices should be logged onto the particular central monitoring station. For example, the priority data could contain identifiers in the form of breathing apparatus identifiers which indicate which breathing apparatus' should be logged onto the particular central monitoring station.

The logon procedure may include the exchange of multiple messages between the portable device and the central monitoring station. This may be termed a "handshake" between the portable device and the central monitoring station. Alternatively, the logon procedure could simply be the immediate registration of the portable device on the central monitoring station. Importantly, a successful logon procedure results in the portable device being registered on the central monitoring station such that the central monitoring station can monitor the portable device.

There may be a plurality of central monitoring stations. In such a case, each central monitoring station may have different priority data. This may ensure that different portable devices are logged onto different central monitoring stations. For example, the priority data of a first central monitoring station may contain the identifiers A1, A2, A3 . . . AN, and the priority data of a second central monitoring station may contain the identifiers B1, B2, B3 . . . AN. This means that when a portable device transmits a logon message containing the identifier A1, it is logged onto the first central monitoring station as opposed to the second monitoring station. Similarly, when a portable device transmits a logon message containing the identifier B1, it is logged onto the second central monitoring station as opposed to the first monitoring station. This may be beneficial as it may be desirable to have certain users/portable devices logged onto certain central monitoring stations.

The logon procedure may be immediately commenced if the logon determination unit determines that the said identifier is contained within the priority data. This may mean that logon starts as soon as a logon message including an identifier contained within the priority data is received. If the logon determination unit determines that the said identifier is not contained within the priority data, the logon procedure may be commenced after a wait time. The wait time may allow the portable device to be logged onto another central monitoring station having priority data which does contain the identifier. However, the wait time may also ensure that if the portable device is not logged onto a central monitoring station after a period of time, for example because there is no central monitoring station having priority data containing the identifier, it is logged onto a non-preferred central monitoring station. This may provide an important safety feature.

If the logon determination unit determines that the said identifier is not contained within the priority data, the portable unit may be queued and the logon procedure may be postponed. The logon procedure may commence at a later time, or may not commence at all depending on whether it is logged on by a different central monitoring station.

The logon unit may be further arranged to generate an error message if the logon procedure fails. The logon procedure may fail if it is not possible to logon the portable device onto the particular central monitoring station. This may be because the portable device goes out of range, or the portable device is logged onto another central monitoring station. The logon unit may be further arranged to transmit a logon acknowledgement message to the said portable device upon commencement of the logon procedure. The logon acknowledgement message may be part of a "handshake" between the portable device and the central monitoring station. The logon acknowledgement may complete the logon procedure or may be part of the logon procedure.

Each portable device may comprise a receiver and may be arranged to sequentially transmit discrete logon messages until the receiver receives a logon acknowledgement message from a central monitoring station. For example, the portable device may transmit a logon message every 5 seconds until it receives a logon acknowledgement message. The receipt of a logon acknowledgement message may indicate to the portable device that one of the logon messages has been received by a central monitoring station and therefore the logon procedure has commenced and it is no longer necessary to transmit logon messages. Each portable device may be arranged to transmit a logon acceptance message to the central monitoring station upon receipt of a logon acknowledgement message. The logon acceptance message may be part of the logon procedure which may be known as a "handshake" and in some embodiments may complete the logon procedure. The logon unit may be further arranged to generate an error message if a logon acceptance message has not been received from the said portable device. This may indicate that the logon procedure or "handshake" has failed.

If the logon determination unit determines that the said identifier is not contained within the priority data, the logon procedure may be commenced after a threshold number of logon messages including the said identifier have been received from the said portable device. This may ensure that the portable device is logged onto a central monitoring station even if it is not the preferred central monitoring station. However, the non-preferred central monitoring station may wait for a period of time or for a threshold number of logon messages before logging it on. This may allow time for the preferred central monitoring station to logon the portable device.

Each portable device may be arranged to initiate the logon procedure by transmitting one or more non-addressed logon messages. By "non-addressed" it is meant that the logon message is not directed to a specific central monitoring station. This may be referred to as "broadcasting" a logon message. The initiation of the logon procedure by the portable device may be in response to a manual action, such as a button press or tally key removal, or may be in response to a stimulus. For example, the portable device may initiate the logon procedure when it is detected that the gas pressure of the breathable gas of the breathing apparatus has risen above a threshold. The gas pressure rise may be the result of the breathing apparatus being turned on. This may be known as automatic logon. One benefit of initiating logon at the portable device is that it is not necessary to visit the central monitoring station and it is not necessary for the central monitoring station operative to take any action. It may therefore be considered to be safer for the user to initiate logon before entering an incident. The central monitoring station may be arranged to initiate the logon procedure by transmitting a non-addressed logon request message. Again, the term "non-addressed" may mean that the logon request message is not addressed to a particular portable device but instead is transmitted and received by all portable devices within range. This type of transmission may be referred to as "broadcasting" a logon request message. This arrangement may allow a central monitoring station operative to start the logon procedure by pressing a button or by activating software which transmits a logon request message to all portable devices within range. However, the priority data would ensure that the portable device is logged onto a preferred central monitoring station. The logon request message may be part of the logon procedure. Each portable device may comprise a receiver, and each portable device may be arranged to transmit one or more logon messages upon receipt of a logon request message. This logon message may be part of the logon procedure or "handshake" and would indicate to the central monitoring station that the particular portable device has received the logon request and is attempting to logon onto the central monitoring station.

Each portable device may be arranged to transmit telemetry data to the central monitoring station when it is logged onto the central monitoring station. The portable device may transmit telemetry data to the central monitoring station in response to a telemetry data request message, or polling message, periodically sent from the central monitoring station. The central monitoring station may only poll specific portable devices logged onto the central monitoring station. Alternatively, logged on portable devices may periodically transmit telemetry data to the central monitoring station of their own accord. The telemetry data may contain status data regarding the status of the breathing apparatus and/or the user. The telemetry data may contain information such as temperature, gas pressure, time to whistle (TTW), PASS/ADSU status. Each portable device may comprise or may be arranged to communicate with sensors for acquiring status data from the breathing apparatus and/or the user. These sensors may include pressure, temperature or heart-rate sensors.

Each portable device may comprise a PASS or ADSU device. This may monitor the movement of the user and may emit a pre-alarm in response to no movement, and a full-alarm if the pre-alarm is not cancelled by button press or movement. If the PASS/ADSU device goes into pre-alarm or full-alarm this may be immediately transmitted to the central monitoring station or may be transmitted on the next telemetry transmission. The PASS or ADSU may be part of or in communication with other discrete units.

The portable device may be a collection of discrete units, such as a PASS/ADSU and a radio unit, or it may be integrated.

The or each central monitoring station may comprise a display arranged to display data relating to logged-on portable devices. The display may be integrated into the central monitoring station or may be a separate display in communication with the other components by a wired or wireless connection. The or each central monitoring station may comprise a portable computer such as a tablet computer. The or each central monitoring station may comprise an electronic entry control board, and may be used to monitor firefighters. There may be a plurality of central monitoring stations.

Each of the plurality of portable devices may be capable of two-way wireless communication with the or each central monitoring station. The wireless communication may be any known technique or protocol.

According to another aspect of the invention there is provided a central monitoring station onto which a plurality of portable devices can be logged on and monitored, the central monitoring station comprising: a receiver arranged to receive logon messages transmitted from portable devices, each arranged to be associated with breathing apparatus worn by a user, the logon messages including an identifier identifying either the user or the portable device; priority data containing the identifiers of users or portable devices which should be logged onto the central monitoring station; a logon determination unit arranged to determine whether the identifier included in a received logon message from a portable device is contained within the priority data; and a logon unit arranged to perform a logon procedure to logon the said portable device onto the central monitoring station; wherein if the logon determination unit determines that the said identifier is contained within the priority data, the logon procedure is commenced.

The logon procedure may be immediately commenced if the logon determination unit determines that the said identifier is contained within the priority data. If the logon determination unit determines that the said identifier is not contained within the priority data, the logon procedure may be commenced after a wait time.

The logon unit may be further arranged to generate an error message if the logon procedure fails. The logon unit may be further arranged to transmit a logon acknowledgement message to the said portable device upon commencement of the logon procedure.

If the logon determination unit determines that the said identifier is not contained within the priority data, the logon procedure may be commenced after a threshold number of logon messages including the said identifier have been received from the said portable device.

The central monitoring station may be arranged to initiate the logon procedure by transmitting a non-addressed logon request message to portable devices.

The central monitoring station may further comprise a display arranged to display data relating to logged-on portable devices. The display may be arranged to display telemetry data received from portable devices logged onto the central monitoring station. The telemetry data may contain status data regarding the status of the breathing apparatus and/or the user.

The central monitoring station may comprise a portable computer such as a tablet computer. The central monitoring station may comprise an electronic entry control board.

The central monitoring station may be capable of two-way wireless communication with a plurality of portable devices.

According to a further aspect of the invention there is provided a method of logging a portable device, associated with breathing apparatus worn by a user, onto a central monitoring station arranged to monitor logged-on portable devices, the method comprising:

(I) the portable device:

transmitting a logon message including an identifier identifying either the user or the portable device;

(II) the central monitoring station:

receiving the transmitted logon message;

determining whether the identifier included in the received logon message is contained within priority data containing the identifiers of users or portable devices which should be logged onto the central monitoring station; and commencing a logon procedure to logon the portable device onto the central monitoring station if it is determined that the identifier is contained within the priority data.

The logon procedure may be immediately commenced if it is determined that the said identifier is contained within the priority data. If it is determined that the said identifier is not contained within the priority data, the logon procedure may be commenced after a wait time.

The central monitoring station may generate an error message if the logon procedure fails. The central monitoring station may transmit a logon acknowledgement message to the portable device upon commencement of the logon procedure.

The portable device may sequentially transmit discrete logon messages until it receives a logon acknowledgement message from a central monitoring station. The portable device may transmit a logon acceptance message to the central monitoring station upon receipt of a logon acknowledgement message. The central monitoring station may generate, an error message if a logon acceptance message has not been received from the portable device.

If it is determined that the identifier is not contained within the priority data, the logon procedure may be commenced after a threshold number of logon messages including the identifier have been received from the portable device.

The portable device may initiate the logon procedure by transmitting one or more non-addressed logon messages. The central monitoring station may initiate the logon procedure by transmitting a non-addressed logon request message. The portable device may transmit one or more logon messages upon receipt of a logon request message.

After the portable device has been logged onto the central monitoring station it may transmit telemetry data to the central monitoring station. The telemetry data may contain status data regarding the status of the breathing apparatus and/or the user. The portable device may acquire status data from the breathing apparatus and/or the user.

The portable device may comprise a PASS device.

The central monitoring station may display data relating to logged-on portable devices. The central monitoring station may comprise a portable computer such as a tablet computer. The central monitoring station may comprise an electronic entry control board.

The portable device and central monitoring station may communicate wirelessly.

There may also be provided a computer program or a computer program product for carrying out any of the methods described herein, and a computer readable medium having stored thereon a program for carrying out any of the methods described herein. A computer program may be stored on a computer-readable medium, or it could, for example, be in the form of a signal such as a downloadable data signal provided from an Internet website, or it could be in any other form.

The invention may comprise any combination of the features and/or limitations referred to herein, except combinations of such features as are mutually exclusive.

Figure 1:
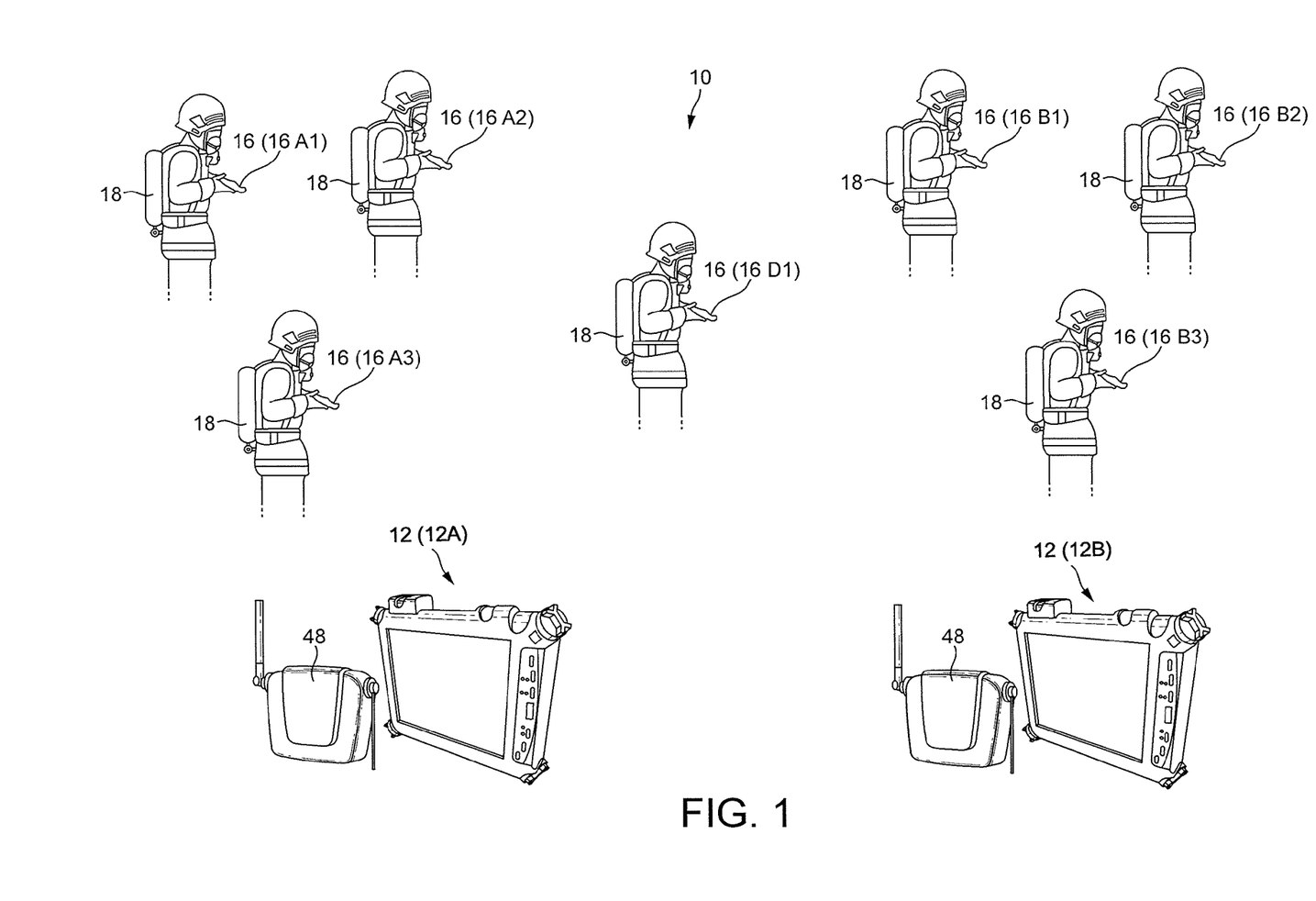
FIG. 1 schematically shows a telemetry monitoring apparatus.

FIG. 1 shows a telemetry monitoring apparatus 10 comprising two central monitoring stations 12 (12A and 12B), and a plurality of portable devices 16 (16A1, 16A2, 16A3, 16B1, 16B2, 16B3, 16D1); each associated with a separate firefighter wearing breathing apparatus 18. The central monitoring stations 12 and portable devices 16 are configured to communicate wirelessly with one another which allows the firefighters to be remotely monitored from outside an incident. As will be described in detail below, each portable device 16 must be logged onto a specific central monitoring station 12 in order for the central monitoring station 12 to monitor it.

Figure 2:
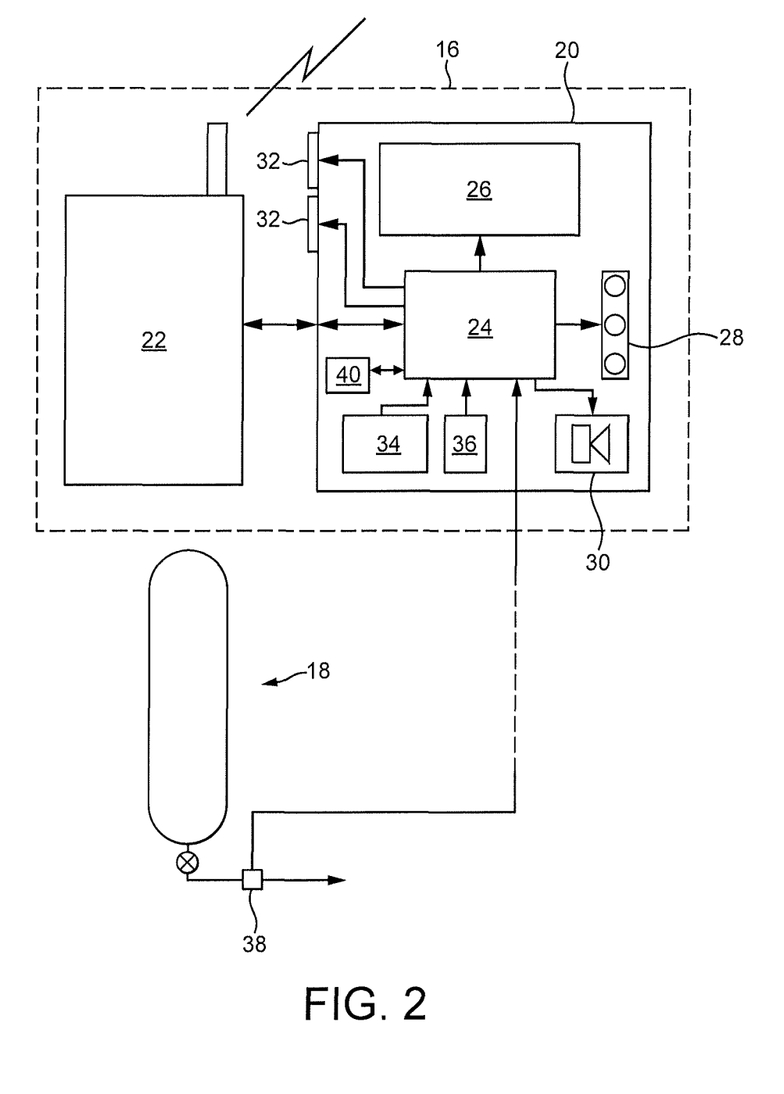
FIG. 2 schematically shows a portable device of the telemetry monitoring apparatus of FIG. 1.

As shown in FIG. 2, each portable device 16 comprises an electronic portable monitoring unit 20, and a radio (or telemetry) module 22. In this embodiment the portable monitoring unit 20 and radio module 22 are distinct units that are connected by a physical wired link. The portable monitoring unit 20 is in the form of a hand-held device and the radio module 22 is incorporated into the harness of the breathing apparatus 18. However, in other embodiments the two units may be integrated or the units may communicate with each other wirelessly via a Bluetooth® link, for example. The radio module 22 is capable of wirelessly transmitting telemetry data to a central monitoring station 12 once it is logged onto a central monitoring station, and in other embodiments may also be capable of transmitting speech to other portable devices 16 and/or to a central monitoring station 12.

The portable monitoring unit 16 comprises a central processor 24 that is connected to an LCD display 26, a plurality of LEDs 28, a sounder 30 and a number of push buttons 32. The processor 24 is also connected via a wired link to the radio module 22. The processor 24 is further connected to a number of sensors for monitoring parameters of any combination of the breathing apparatus 26, the firefighter, or the ambient surroundings. The sensors may be directly incorporated into the portable monitoring unit 20, or may be external and connected to the portable monitoring unit 20 by a wired or wireless, such as Bluetooth®, link. In this particular embodiment the portable monitoring unit 20 includes a motion detector 34 and a temperature sensor 36 connected to the processor 24. The portable monitoring unit 20 is connected to an external electronic pressure transducer 38 that is arranged to measure the pressure of the cylinder of breathable gas of the breathing apparatus 18. It should be appreciated that in other embodiments the portable monitoring unit 20 may incorporate an electronic pressure transducer and a pneumatic line from the cylinder may be connected to the portable monitoring unit 20 in order to measure the pressure.

The processor 24 is arranged to continuously monitor the gas pressure and temperature and these parameters can be displayed to the wearer on the LCD display 26. The wearer can "toggle" through the various parameters by using the buttons 32. In this embodiment the processor 24 is also configured to calculate the time-to-whistle (TTW) and this parameter can also be displayed. If the pressure drops below a critical threshold the processor 24 may activate one or more of the LEDs 28 in order to warn the wearer. Further, the portable monitoring unit 20 is configured to function as an ADSU (or PASS). The processor 24 continuously monitors the movement of the wearer using the motion detector 34 and if motion is not detected for a pre-determined period of time then the sounder 30 emits a pre-alarm and a combination of LEDs 28 is activated. A message may also be displayed on the LCD display 26. This pre-alarm can be cancelled by the wearer pressing a combination of buttons 32 or by moving. If the pre-alarm is not cancelled within a pre-set period of time then the sounder 30 emits a full-alarm and a different combination of LEDs 28 is activated. The full-alarm can also be activated by pressing a panic button 32.

The monitoring unit 20 further comprises a storage medium 40 which contains the unique address or identifier of the portable device 16 and a unique firefighter identifier which identifies the firefighter using the portable device. For example, the address or identifier of the portable device 16A1 may be 0123456789A1, the address of the portable device 16A2 may be 0123456789A2 etc. The firefighter identifier of the portable device 16A1 may be FM54321, for example. The portable device 16 may contain a fixed firefighter identifier, or it may be possible to change the firefighter identifier depending on who is using the portable device 16, by overwriting the storage medium 40. The firefighter identifier may contain information about the firefighter (for example, name, brigade, date of birth) or may be a character string, FM54321, that is associated with firefighter information in a database.

Figure 3:
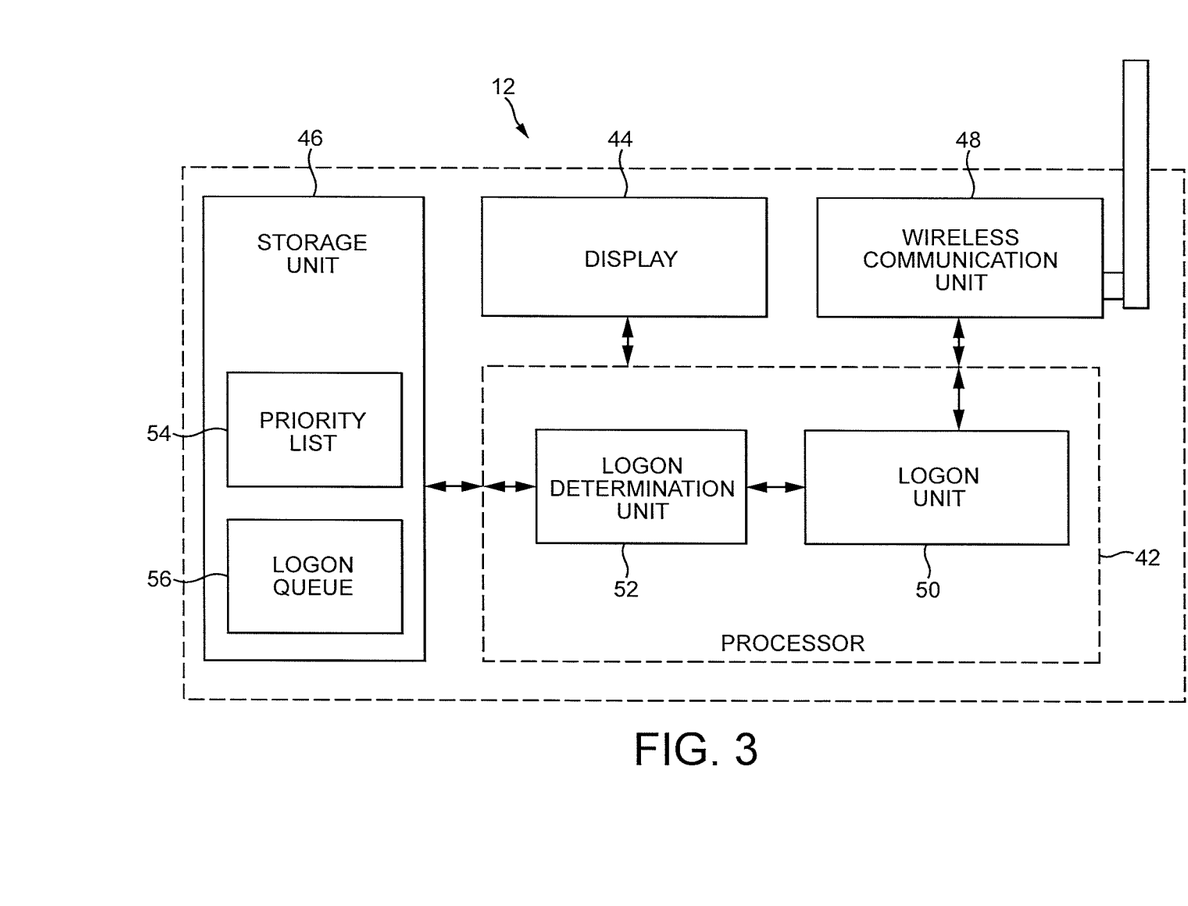
FIG. 3 schematically shows a central monitoring station of the telemetry monitoring apparatus of FIG. 1.

With reference to FIG. 3, each central monitoring station 12 comprises a central processor 42, a touch screen display 44, a storage unit 46 and a wireless communication unit 48. The storage unit 46 is loaded with proprietary firefighter monitoring software that when executed by the processor 42 allows the central monitoring station 12 to remotely monitor portable devices 16 associated with firefighters wearing breathing apparatus. In this particular embodiment the central monitoring station 12 is in the form of a tablet PC which is wired to a wireless communication unit 48 configured for wireless communication with portable devices 16. However, in other embodiments the central monitoring station could be a bespoke integrated apparatus, for example.

In order for a central monitoring station 12 to remotely monitor a portable device 16 associated with a firefighter wearing breathing apparatus, it is necessary for the specific portable device 16 to be registered with, or logged onto, a central monitoring station 12. The central monitoring station 12 is therefore provided with a logon unit 50, a logon determination unit 52, a priority list 54, and a logon queue 56 which controls the logon of portable devices 16. In this embodiment the functionality of the logon unit 50 and logon determination unit 52 is provided by the central processor 42 executing computer readable instructions stored on the storage unit 46, but in other embodiments may be separate processors, for example. The priority list 54, which contains priority data which will be described in detail below, and the logon queue 56 are stored within the main storage unit 46.

In some circumstances, particularly if multiple central monitoring stations 12 are being used, it may be desirable to logon a specific portable device 16 onto a particular central monitoring station 12. For example, referring back to FIG. 1, it is desirable to logon the portable devices 16A1, 16A2 and 16A3 onto the central monitoring station 12A, and it is desirable to logon the portable devices 16B1, 16B2 and 16B3 onto the central monitoring station 12B. In this example, the portable devices 16A1, 16A2, 16A3 and the central monitoring station 12A are from fire brigade A, and the portable devices 16B1, 16B2, 16B3 and the central monitoring station 12B are from fire brigade B. Therefore, it is important that brigade A's firefighters are monitored by an entry control officer from brigade A at central monitoring station 12A. Likewise, it is important that brigade B's firefighters are monitored by an entry control officer from brigade B at central monitoring station 12B. Of course, there are other circumstances where it is desirable to monitor specific firefighters on specific monitoring stations. For example, there may be sub-teams within one brigade entering from different locations.

In order to ensure that the portable devices 16 (or firefighters) are logged onto the preferred central monitoring station 12, the priority list 54 of each central monitoring station 12 contains information identifying the firefighters and/or portable devices 16 which should be logged onto that central monitoring station 12. The information identifying the firefighters/portable devices 16 is in the form of an identifier that uniquely identifies either the firefighter or the portable device 16. The identifier may be the address of the portable device 16, or may be the firefighter identifier. In this embodiment the priority list 54 contains only the addresses of portable devices 16 (which may be termed "portable device identifiers") that should be logged onto the central monitoring station 12. However, in other embodiments the priority list 54 may contain lists of both portable device identifiers and firefighter identifiers that should be logged onto the central monitoring station. Tables 1 and 2 are illustrative examples of the priority lists 54 of the central monitoring stations 12.

TABLE 1

Portable device identifiers to be logged onto central monitoring station 12A

0123456789A1
0123456789A2
0123456789A3
. . .
0123456789An

TABLE 2

Portable device identifiers to be logged onto central monitoring station 12B

0123456789B1
0123456789B2
0123456789B3
. . .
0123456789Bn

As can be seen, the priority list 54 of central monitoring station 12A contains the portable device identifiers of all of brigade A's portable devices, and the priority list 54 of central monitoring station 12B contains the portable device identifiers of all of brigade B's portable devices. The priority lists 54 may be created manually by entering a portable device identifier or a firefighter identifier, or may be created automatically by scanning an RFID tag or a barcode, for example.

In this embodiment there are two methods for initiating a logon procedure in which a portable device 16 is logged onto a central monitoring station 12. The first method is known as portable device initiation, and the second method is known as central monitoring station initiation.

Portable Device Initiation

In portable device initiation, the portable device 16 initiates a logon procedure by wirelessly transmitting logon messages which are not addressed to a particular central monitoring station 12, but instead can be received by all central monitoring stations 12 within range. The portable device 16 transmits a series of discrete logon messages at regular time intervals and, as will be described below, only stops transmitting logon messages on receipt of a logon acknowledgement from a central monitoring station 12. Logon can be initiated by pressing a combination of buttons 32, by the removal of a tally key (not shown), or may be automatically initiated by the portable device 16 when the processor 24 detects that the pressure measured by the pressure transducer 38 is above a threshold. If the latter method is used, a logon message is automatically transmitted (or broadcast) as soon as the breathing apparatus 10 is turned on. This may be an important safety feature.

The logon message transmitted by the radio unit 22 of the portable device 16 contains various information which identifies it as a logon message, and also includes an identifier which uniquely identifies either the portable device 16 or the firefighter. In this embodiment, the identifier included in the logon message is the portable device identifier which is the unique address of the portable device 16 stored in the storage medium 40.

The logon message including the identifier is received by all central monitoring stations 12 within range. The logon message is received by the wireless communication unit 48 which sends the logon message to the central processor 42 which checks whether the portable device 16 that has transmitted the logon message should be logged onto the particular monitoring station 12. Specifically, the logon determination unit 52 checks whether the identifier included within the logon message is contained within the priority list 54. If the identifier included in the logon message is contained within the priority list 54 then the logon procedure is immediately commenced by the logon unit 50 in order to logon the specific portable device 16 onto the particular central monitoring station 12.

If the identifier included in the logon message is not contained within the priority list 54 then as opposed to immediately commencing a logon procedure, the identifier is queued in the logon queue 56. Queuing the logon of the portable device 16 allows time for the portable device 16 to be logged onto another preferred central monitoring station 12 having a priority list 54 that does contain the identifier. If the portable device 16 does not log onto another central monitoring station 12 then it will continue to transmit logon messages which will be received by the central monitoring station 12 even though the identifier is not contained within the priority list 54. Therefore, each time another logon message is received including an identifier not contained within the priority list 54, a counter is incremented in the logon queue 56. After the counter reaches a threshold, which is equivalent to the number of logon messages received from a portable device 16 having an identifier not contained within the priority list 54, the logon procedure is commenced by the logon unit 50. This ensures that if there is no preferred central monitoring station 12 within range having a priority list 54 including the identifier of the portable device 16, it is still logged onto a central monitoring station 12. This is an important safety feature.

When the logon unit 50 performs a logon procedure an exchange of messages, otherwise known as a "handshake" occurs to register the portable device 16 onto the central monitoring station 12. Upon commencement of the logon procedure the logon unit 50 transmits (via the wireless communication unit 48) a logon acknowledgement message addressed to the specific portable device 16 indicating that it is attempting to register it at the central monitoring station 12. On receipt of this logon acknowledgement message the portable device 16 stops sending out non-addressed logon messages and transmits back to the specific central monitoring station 12 an addressed logon acceptance message indicating that it has accepted logon. When this logon acceptance message has been received by the specific central monitoring station 12 the logon procedure is complete and the specific portable device 16 is logged on at the particular central monitoring station 12. If the logon procedure fails at any point, the central monitoring station 12 generates an error message. After the portable device 16 has been logged on it periodically transmits telemetry data to the central monitoring station 12 which allows the firefighter to be remotely monitored.

Example 1

An example will now be described with reference to FIG. 1, in which the portable device 16A1 initiates a logon procedure. When the portable device 16A1 initiates a logon procedure, either by detection of a threshold gas pressure or by button press, for example, it starts to periodically transmit a non-addressed logon message containing an identifier that identifies the specific portable device 16 or firefighter. In this embodiment the logon messages transmitted by the portable device 16A1 includes the portable device identifier which is the address of the portable device 16A1—0123456789A1. The logon message is received by all central monitoring stations 12 in range, namely, the central monitoring station 12A and the central monitoring station 12B. The logon determination units 52 of both central monitoring stations 12A, 12B check whether the identifier 0123456789A1 is included in the logon message is contained within the respective priority lists 54. The logon determination unit 52 of the central monitoring station 12A determines that the identifier 0123456789A1 is contained in the priority list 54 and therefore the respective logon unit 50 commences a logon procedure to logon the portable device 16A1 onto the central monitoring station 12A. However, the logon determination unit 52 of the central monitoring station 12B determines that the identifier 0123456789A1 is not contained in the priority list 54 and therefore the portable device 16A1 is placed in the logon queue 56. Upon commencement of the logon procedure by the logon unit 50 of the central monitoring station 12A, a logon acknowledgment message is sent to the portable device 16A1 which stops sending logon messages and which transmits a logon acceptance message to the central monitoring station 12A. On receipt of the logon acceptance message, the logon procedure is complete and the portable device 16A1 is registered on the central monitoring station 12A.

Example 2

An example will now be described with reference to FIG. 1, in which the portable device 16D1 initiates a logon procedure. When the portable device 16D1 initiates a logon procedure either by detection of a threshold gas pressure or by button press, for example, it starts to periodically transmit a non-addressed logon message containing an identifier that identifies the specific portable device 16 or firefighter. In this embodiment the logon messages transmitted by the portable device 16D1 includes the portable device identifier which is the address of the portable device 16D1—0123456789D1. The logon message is received by all central monitoring stations 12 in range, namely, the central monitoring station 12A and the central monitoring station 12B. The logon determination units 52 of both central monitoring stations 12A, 12B check whether the identifier 0123456789D1 is included in the logon message is contained within the respective priority lists 54. The logon determination units 52 of both central monitoring stations 12A, 12B determine that the identifier 0123456789D1 is not contained in the respective priority lists 54 and therefore the portable device 16D1 is placed in the logon queue 56 of both central monitoring stations 12A, 12B. Since neither central monitoring station 12A, 12B transmits a logon acknowledgement message, the portable device 16D1 continues to transmit logon messages which are received by both central monitoring stations 12A, 12B. Each time a logon message containing the identifier 0123456789D1 is received, a counter in the logon queue 56 is incremented until a threshold, such as 8, is reached. After the counter reaches 8, indicating that 8 logon messages have been received from the particular portable device 16D1, the logon unit 50 commences a logon procedure since no other central monitoring station 12 is attempting to logon the particular portable device 16D1. Both central monitoring stations 12A, 12B will commence the logon procedure at approximately the same time by transmitting a logon acknowledgement message to the portable device 16D1. On receipt of the first logon acknowledgement message, the portable device 16D1 will stop transmitting logon messages and will transmit a logon acceptance message to the central monitoring station from which it received the first logon acknowledgement message. In this example, the first logon acknowledgment message is received from the central monitoring station 12B and therefore the portable device 16D1 transmits a logon acceptance message to the central monitoring station 12B. On receipt of the logon acceptance message, the logon procedure is complete and the portable device 16D1 is registered on the central monitoring station 12B. This arrangement ensures that if there is no preferred central monitoring station 12 in range, the portable device 16 is logged onto any central monitoring station 12.

Central Monitoring Station Initiation

In central monitoring station initiation, the wireless communication unit 48 of the central monitoring station 12 transmits (or broadcasts) a non-addressed logon request message that can be received by all portable devices 16 in range. On receipt of a logon request message, a portable device 16 transmits a logon message to the central monitoring station including an identifier that identifies either the portable device 16 or the firefighter. This logon message is treated in the same way as if it had been transmitted by the portable device 16 upon portable device initiation. Essentially, the logon determination unit 52 checks whether the identifier is contained within the priority list 54 and if so the logon procedure is immediately commenced, and if not then it is queued in the logon queue 56. This ensures that if multiple central monitoring stations are in use, a particular portable device 16 is logged onto a preferred central monitoring station 12.

A particular firefighter telemetry monitoring apparatus may be able to use portable device initiation, central monitoring station initiation, or either to perform logon.

In the above described embodiment the identifier included in the logon message uniquely identifies the portable device from which it originates. However, it should be appreciated that in other embodiments the logon message could include an identifier that uniquely identifies the user (firefighter) using the portable device in addition to, or instead of, the portable device identifier. The priority list may therefore contain firefighter identifiers and/or portable device identifiers and the logon procedure may be commenced immediately if the firefighter identifier or the portable device identifier is included in the priority list.

Once a portable device 16 has been logged onto a central monitoring station 12 an area or line of the display 44 is allocated to the firefighter/portable device and data relating to the firefighter/portable device is displayed. This data may include data about the firefighter, such as their name, and also includes real-time telemetry data. The telemetry data is periodically wirelessly transmitted from the portable device 16 to the central monitoring station 12. In this embodiment the central monitoring station 12 periodically polls (transmits a telemetry data request to) all logged on portable devices 16 and in response to this request the portable device 16 transmits back telemetry data. However, in other embodiments the portable device 16 may periodically transmit telemetry data of its own volition. The telemetry data includes status data acquired by the sensors 34, 36, 38 of the portable device 16 and therefore includes temperature, movement status, and gas pressure. The telemetry data also includes information calculated by the processor 24 of the portable device 16 such as time-to-whistle. If the ADSU/PASS of the portable device 16 goes into either pre-alarm or full-alarm then this may be immediately transmitted back to the central monitoring station 12 and displayed on screen. Further, using the touch screen display 44, the central monitoring station operative can send information to individual, or all, portable devices 16 logged onto the central monitoring station. For example, the operative may be able to transmit an evacuation signal to all portable devices 16 logged on, or to a specific portable device 16 logged on.

In some circumstances it may be desirable to "group" firefighters/portable devices 16 logged onto a central monitoring station 12. This grouping may also be referred to as forming "teams". The groups or teams of firefighters may be those firefighters that may work together. The teams can be formed by manipulating the touch screen display 44 by dragging and dropping the firefighters logged onto the central monitoring station 12. As part of forming teams, a team leader can be designated and the information relating to the team leader can be displayed at the top of the team group. In some embodiments it may be possible to "collapse" the team so that only telemetry data relating to the team leader is displayed. Alternatively, the most "critical" firefighter may be displayed.

Although it may be possible to form the teams manually after the firefighters/portable devices 16 are logged onto the central monitoring station 12, in some embodiments it may be possible to pre-form the teams. Therefore, the storage unit 46 may be provided with "team data" which specifies a series of pre-formed teams. For example, it may specify that certain portable device identifiers or firefighter identifiers should be grouped into particular teams. When a particular firefighter/portable device is logged onto the central monitoring station 12, the processor 42 may check the team data in the storage unit 46 to check whether the firefighter/portable device should be placed in a team. If it should be placed into a team then this is carried out automatically. This may provide the benefit that it is not necessary to form teams at the incident which may improve the ease of operation.

Although it has been described that the telemetry monitoring apparatus is for monitoring firefighters, it should be appreciated that the apparatus could be used to monitor other persons where it is desirable to monitor telemetry data remotely.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention. This disclosure is intended to cover any adaptations or variations of the embodiments discussed herein.

The invention claimed is:

1. A method of logging a portable device, associated with breathing apparatus worn by a user, onto a central monitoring station arranged to monitor logged-on portable devices, the method comprising:
    the portable device:
        sequentially transmitting one or more discrete logon messages including an identifier identifying either the user or the portable device until the portable device receives a logon acknowledgement message from a central monitoring station;
    the central monitoring station:
        storing priority data in the central monitoring station, said priority data indicating the users or portable device(s) which should be associated with the central monitoring station;
        receiving at least one of the one or more discrete logon messages;
        determining whether the identifier included in the received logon message is contained within the priority data;
        immediately commencing a logon procedure to logon the portable device onto the central monitoring station if it is determined that the identifier is contained within the priority data;
        commencing a logon procedure after a threshold number of discrete logon messages including the identifier identifying either the user or the portable device have been received from the portable device if it is determined that the identifier is not contained within the priority data; and
        transmitting a logon acknowledgement message to the portable device upon commencement of the logon procedure; and
        completing the logon procedure after commencing the logon procedure so that the portable device is logged on at the central monitoring station even when the identifier included in the logon message is not contained within the priority data;
    the portable device:
        transmitting a logon acceptance message to the central monitoring station upon receipt of a logon acknowledgement message.

2. A method of logging a portable device, associated with breathing apparatus worn by a user, onto a central monitoring station arranged to monitor logged-on portable devices, the method comprising:
    (I) the portable device:
        transmitting a logon message until the portable device receives a logon acknowledgement message from a central monitoring station, said logon message including an identifier identifying either the user or the portable device; and
    (II) the central monitoring station:
        storing priority data in the central monitoring station, said priority data indicating the users or portable device(s) which should be associated with the central monitoring station;
        receiving the transmitted logon message;
        determining whether the identifier included in the received logon message is contained within priority data;
        immediately commencing a logon procedure to logon the portable device onto the central monitoring station if it is determined that the identifier is contained within the priority data;
        commencing a logon procedure after a threshold number of messages including the identifier are received if it is determined that the identifier is not contained within the priority data;
        transmitting a logon acknowledgement message to the portable device upon commencement of the logon procedure; and
        completing the logon procedure after commencing the logon procedure so that the portable device is logged on at the central monitoring station even when the identifier included in the logon message is not contained within the priority data
    (III) the portable device:
        transmitting a logon acceptance message to the central monitoring station upon receipt of a logon acknowledgement message.

3. The method according to claim 2, wherein the central monitoring station generates an error message if the logon procedure fails.

4. The method according to claim 2, wherein the central monitoring station transmits a logon acknowledgement message to the portable device upon commencement of the logon procedure.

5. The method according to claim 2, wherein the central monitoring station generates an error message if a logon acceptance message has not been received from the portable device.

6. The method according to claim 2, wherein the portable device initiates the logon procedure by transmitting one or more non-addressed logon messages.

7. The method according to claim 2, wherein the central monitoring station initiates the logon procedure by transmitting a non-addressed logon request message, and wherein the portable device transmits one or more logon messages upon receipt of a logon request message.

8. The method according to claim 2, wherein after the portable device has been logged onto the central monitoring station it transmits telemetry data to the central monitoring station.

9. The method according to claim 8, wherein the telemetry data contains status data regarding the status of the breathing apparatus and/or the user.

10. The method according to claim 9, wherein the portable device acquires status data from the breathing apparatus and/or the user.

11. The method according to claim 2, wherein the central monitoring station displays data relating to logged-on portable devices.

12. The method according to claim 2, wherein the central monitoring station comprises an electronic entry control board.

13. The method according to claim 2, wherein the portable device and central monitoring station communicate wirelessly.

14. A telemetry monitoring apparatus for remotely monitoring a plurality of users working in a hazardous environment comprising:
   a plurality of portable devices, each arranged to be associated with breathing apparatus worn by a user and arranged to transmit a logon message including an identifier identifying either the user or the portable device, said logon message being transmitted by each such portable device until the portable device receives a logon acknowledgement message;
   at least one central monitoring station onto which portable devices can be logged on and monitored, the or each central monitoring station comprising:
      a wireless communication unit arranged to receive logon messages;
      priority data stored within the or each central monitoring station indicating the users or portable device(s) which should be associated with the or each central monitoring station;
      a logon determination processor arranged to determine whether the identifier included in a received logon message from a portable device is contained within the priority data; and
      a logon processor arranged to perform a logon procedure to logon the said portable device onto the central monitoring station, and to transmit a logon acknowledgement message to the portable device upon commencement of the logon procedure;
         wherein if the logon determination processor determines that the said identifier is contained within the priority data, the logon procedure is immediately commenced and subsequently completed so that the portable device is logged on at the central monitoring unit,
         wherein if the logon determination processor determines that the identifier is not contained within the priority data, the logon procedure is commenced after a threshold number of messages including the identifier are received, the logon procedure subsequently being completed after commencing logon so that the portable device is logged on at the central monitoring unit even when the identifier is not contained within the priority data, and
      wherein the portable device transmits a logon acceptance message to the central monitoring station upon receipt of a logon acknowledgement message.

15. A central monitoring station for use with the telemetry monitoring apparatus in accordance with claim 14.

* * * * *